United States Patent
Knoll et al.

[11] Patent Number: 5,854,353
[45] Date of Patent: Dec. 29, 1998

[54] THERMOPLASTIC MOLDING COMPOUND

[75] Inventors: Konrad Knoll, Ludwigshafen; Hermann Gausepohl, Mutterstadt, both of Germany

[73] Assignee: BASF Aktiengesellschaft, Ludwigshafen, Germany

[21] Appl. No.: 750,635

[22] PCT Filed: May 31, 1995

[86] PCT No.: PCT/EP95/02072

§ 371 Date: Dec. 16, 1996

§ 102(e) Date: Dec. 16, 1996

[87] PCT Pub. No.: WO95/34586

PCT Pub. Date: Dec. 21, 1995

[30] Foreign Application Priority Data

Jun. 16, 1994 [DE] Germany .......................... 44 20 917.7
Oct. 13, 1994 [DE] Germany .......................... 44 36 499.7

[51] Int. Cl.⁶ .................................................. C08F 293/00
[52] U.S. Cl. ........................... 525/314; 526/346; 526/347
[58] Field of Search ............................. 525/314; 526/346, 526/347

[56] References Cited

U.S. PATENT DOCUMENTS

| | | | |
|---|---|---|---|
| 3,280,084 | 10/1966 | Zelinski et al. .......................... | 260/83.7 |
| 3,637,554 | 1/1972 | Childers ................................. | 260/23.7 |
| 3,985,830 | 10/1976 | Fetters et al. ........................... | 260/880 |
| 4,091,053 | 5/1978 | Kitchen .................................. | 260/880 |

FOREIGN PATENT DOCUMENTS

| | | |
|---|---|---|
| 210 615 | 2/1987 | European Pat. Off. . |
| 312 976 | 4/1989 | European Pat. Off. . |
| 318 833 | 6/1989 | European Pat. Off. . |
| 535 582 | 4/1993 | European Pat. Off. . |
| 3-79613 | 3/1991 | Japan . |

OTHER PUBLICATIONS

WPI Derwent Abstracts, AN 91–143958[20] Abstract of JP–3079613 Aug. 22, 1989.
Bull. Chem. Soc. Japan, vol. 40, 1967, pp. 2569–2572.
Polymer Letters, vol. 8, pp. 499–503, 1970.
WPI Derwent Abstracts, AN 91–143958[20] (English abstract of JP–3079613, Aug. 22, 1989).

Primary Examiner—Edward J. Cain
Attorney, Agent, or Firm—Keil & Weinkauf

[57] ABSTRACT

Thermoplastic molding compounds comprise as essential components

A) from 10 to 100% by weight of copolymers of the monomers of the general formulae I and II

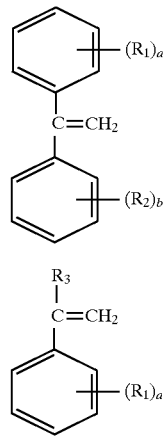

where
$R_1$ is H or alkyl of 1–22 carbon atoms,
$R_2$ is H or alkyl of 1–22 carbon atoms,
$R_3$ is H or alkyl of 1–4 carbon atoms,
a is 0, 1, 2, 3, 4 or 5, and
b is 0, 1, 2, 3, 4 or 5, B) from 0 to 3000 ppm, based on the weight of component A, of compounds of the general formula I, C) from 0 to 500 ppm, based on the weight of component A, of compounds of the general formula II, D) from 0 to 90% by weight, based on the total weight of the molding compound, of polymers other than A), and E) from 0 to 50% by weight, based on the total weight of the molding compound, of additives and processing aids.

8 Claims, No Drawings

THERMOPLASTIC MOLDING COMPOUND

DESCRIPTION

The present invention relates to thermoplastic molding compounds comprising as essential components A) from 10 to 100% by weight of copolymers of the monomers of the general formulae I and II

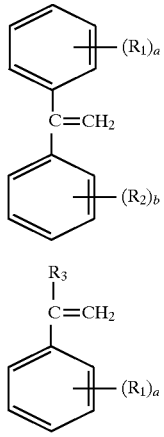

where
- $R_1$ is H or alkyl of 1–22 carbon atoms,
- $R_2$ is H or alkyl of 1–22 carbon atoms,
- $R_3$ is H or alkyl of 1–4 carbon atoms,
- a is 0, 1, 2, 3, 4 or 5, and
- b is 0, 1, 2, 3, 4 or 5, B) from 0 to 3000 ppm, based on the weight of component A, of compounds of the general formula I, C) from 0 to 500 ppm, based on the weight of component A, of compounds of the general formula II, D) from 0 to 90% by weight, based on the total weight of the molding compound, of polymers other than A), and E) from 0 to 50% by weight, based on the total weight of the molding compound, of additives and processing aids.

Molded thermoplastics are hard and rigid at room temperature. At higher temperatures, however, the usefulness of thermoplastics is limited by the glass transition temperature or by the melting point in the case of partly crystalline thermoplastics. This also applies to atactic polystyrene, whose glass transition temperature is 101° C. and which does not crystallize because of the irregular orientation of the phenyl rings. Lately it has been possible, by means of metallocene catalysis, to produce a syndiotactic polystyrene whose crystalline regions have a melting point of 275° C. (e.g. EP-A-210 615, EP-A-535 582, EP-A-312 976 and EP-A-318 833).

Syndiotactic polystyrene, however, has various disadvantages. For instance, the processing range for the production of moldings is relatively small, since the product has to be heated to above the melting point on the one hand, but it will decompose at above 310° C. on the other. The consequence is that the product readily depolymerizes back to styrene monomer during processing.

Furthermore, the product crystallizes in various forms which have a significant effect on the performance characteristics of the molded part. Finally, only the crystalline regions have the high melting point; the amorphous regions still have a glass transition temperature of 101° C. as before.

The polymerization of 1,1-diphenylethylene with styrene is known and described in Bulletin Chem. Soc. Jap. 40 (1967), 2569, and in J. Polymer Sci., Part B, 8 (1970), 499. However, the method described in these publications has the disadvantage that the polymerization proceeds extremely slowly and the conversion is incomplete if higher softening points are to be obtained.

The diphenylethylene monomer remaining in the copolymer lowers its glass transition temperature and so makes it worthless for commercial purposes.

It is an object of the present invention to provide thermoplastic molding compounds which are free of the above-described disadvantages, which have a glass transition temperature of at least 130° C. and which have a residual monomer content of <4000 ppm.

We have found that this object is achieved by thermoplastic molding compounds as claimed in claim 1.

Preferred molding compounds of this invention are disclosed in the subclaims.

Component A of the thermoplastic molding compounds of this invention comprises from 10 to 100, preferably from 40 to 100, especially from 60 to 100, % by weight, based on the proportion of polymeric components, of a copolymer having units derived from monomers I and II.

The monomers of the general formula I are 1,1-diphenylethylene and its derivatives where the aromatic rings are substituted by alkyl having up to 22 carbon atoms. Preferred alkyl substituents are alkyl groups having 1 to 4 carbon atoms, such as methyl, ethyl, isopropyl, n-propyl, n-butyl, isobutyl and tert-butyl, to name but a few. However, the unsubstituted 1,1-diphenylethylene itself is particularly preferred.

The monomers of the general formula II are styrene and its derivatives where there is substitution by alkyl having 1 to 4 carbon atoms in the $\alpha$-position or on the aromatic ring. Preferred alkyl groups are those mentioned above as preferred for monomers of the formula I; unsubstituted styrene itself is particularly preferred.

The molar ratio of units derived from monomer I to units derived from monomer II is generally within the range from 1:1 to 1:25, preferably within the range from 1:1.05 to 1:15, particularly preferably within the range from 1:1.1 to 1:10. Since the monomers of the formula I generally do not homopolymerize, products having molar ratios of more than 1:1 are not readily obtainable.

The novel process for producing component A) of the molding compounds of this invention comprises providing the monomers of the formula I as initial charge and metering in the monomers of the formula II during the reaction according to a gradient method such that, as the reaction progresses, the amount of monomer II added per unit time is essentially reduced according to the amount of monomer I still present. This manner of performing the reaction keeps the monomer ratio approximately constant during the entire polymerization. To control the addition gradient, it is advantageously possible to utilize the change in the refractive index, which is a function of the monomer ratio. A further possibility is to determine the monomer ratio as a function of the conversion in a number of preliminary experiments and so to obtain an appropriate calibration curve.

The monomers mentioned are advantageously reacted in an inert solvent. "Inert" in this context means that the solvent does not react with the organometallic initiator customarily used for initiating the reaction. Both aliphatic and aromatic hydrocarbons are therefore suitable in general. Examples of suitable solvents include cyclohexane, methylcyclohexane, benzene, toluene, ethylbenzene and xylene.

Finally, it is also possible to use hydrocarbons in which the copolymer formed in the course of the reaction is not soluble. In this case, a precipitation polymerization or, by means of a dispersant, a dispersion polymerization can be carried out instead of the solution polymerization. Examples of suitable reaction media for such process variants include butane, pentane, n-hexane, isopentane, heptane, octane and isooctane.

The polymerization is generally initiated by means of organometallic compounds; i.e., the polymerization is an anionic polymerization. Preference is given to compounds of the alkali metals, especially of lithium. Examples of initiators are methyllithium, ethyllithium, propyllithium, n-butyllithium, sec-butyllithium and tert-butyllithium. The organometallic compound is generally added as a solution in a chemically inert hydrocarbon. The rate of addition depends on the molecular weight desired for the polymer, but is generally within the range from 0.002 to 5 mol %, on the basis of the monomers.

Small amounts of polar aprotic solvents can be added to obtain higher polymerization rates. Examples of suitable solvents are diethyl ether, diisopropyl ether, diethylene glycol dimethyl ether, diethylene glycol dibutyl ether and, especially, tetrahydrofuran. The polar cosolvent is generally added to the apolar solvent in a small amount of about 0.5–5% by volume in this process variant. Particular preference is given to THF in an amount of 0.1–0.3% by volume. Pure THF has an adverse influence on the reaction parameters, so that the polymer comprises high residual levels of monomers of the formula I.

The polymerization temperature can be within the range from 0° to 130° C. Preference is given to temperatures of 50°–90° C. In general, the polymerization is carried out under isothermal conditions; that is, with a constant polymerization temperature. However, the temperature can also be allowed to rise within the range of 0°–130° C., preferably 30°–120° C. It is particularly advantageous to carry out the initial part of the polymerization under isothermal conditions and to allow the temperature to rise adiabatically toward the end of the polymerization, i.e. at low monomer concentrations, in order that the polymerization times may be kept short.

The reaction times are generally within the range from 0.1 to 24, preferably from 0.5 to 12, particularly preferably from 1 to 10, h.

Component B) of the thermoplastic molding compounds of this invention comprises from 0 to 3000, preferably from 0 to 2000, particularly preferably from 100 to 1000, ppm of monomers of the formula I. Preferably, the monomers have the same formula as the monomers incorporated into the copolymer in the course of the polymerization.

Component C) of the thermoplastic molding compounds of this invention comprises from 0 to 500, preferably from 0 to 200, in particular from 20 to 100, ppm of monomers of the formula II. These monomers preferably have the same chemical formula as the monomers used in preparing component A).

The amounts of components B) and C) are based on the weight of component A in the thermoplastic molding compounds.

Component D) of the thermoplastic molding compounds of this invention comprises from 0 to 90, preferably up to 60, especially up to 30, % by weight, based on the total weight of the molding compound, of further components other than copolymer A). In principle, no particular restriction applies as to the structure of these further polymeric components; however, preference is given to polymers which have at least a certain degree of compatibility with component A), since the mechanical properties are generally not satisfactory otherwise. Preferred polymers are styrene polymers such as high impact or crystal polystyrene or else polyphenylene ether addition polymers with or without an admixture of styrene polymers.

Furthermore, the thermoplastic molding compounds of this invention may additionally include as component E) up to 50% by weight, based on the total weight of the thermoplastic molding compound, of further, additive substances and processing aids. Such additives are known to the person skilled in the art and described in the literature, so that there is no need for details here. Examples are fibrous and particulate fillers, stabilizers against heat and UW light, demolding agents and lubricants. Similarly, pigmentation of the molding compounds of this invention is possible, of course.

A further embodiment of the present invention takes the form of block copolymers with blocks A and B of the following general structures: $(A—B)_n$, $A—B—A$, $B—A—B$, $X[(A—B)_n]_m$, $X[(B—A)_n]_m$, $X(A—B—A)_m$, or $X(B—A—B)_m$ where A is a block of a copolymer of monomers of the general formulae I and II, B is a block of monomers of the general formula II, X is the radical of an m-functional coupling agent, n is an integer from 1 to 5, and m is an integer from 2 to 20.

The coupling agent X reacts with the living anionic chain ends after the polymerization to form the above-described structures. Examples of suitable coupling agents may be found in U.S. Pat. Nos. 3,985,830, 3,280,084, 3,637,554 and 4,091,053. Merely illustrative examples are epoxidized glycerides such as epoxidized linseed oil or soybean oil; divinylbenzene is also suitable. If the living anionic end is situated on the B-block, then the coupling is preferably carried out with compounds containing epoxy and/or ester groups; if, however, the A-block forms the active end, it is preferable to use divinylbenzene for the coupling.

The block transitions may be sharp or tapered.

A tapered transition refers to a piece of the molecular chain in which the monomers of block A form a random distribution with the monomers of block B. The molecular weight desired for the blocks is controlled via the ratio of initiator to monomer.

The disclosed block copolymers with a polymer block derived from monomers of the general formula II mix with crystal or high impact polystyrene to form polymer blends having a raised softening point and good mechanical properties.

In addition, the block copolymers of this invention can be used as such. They are particularly suitable for food contact applications, since their residual monomer content is extremely low, advantageously below 3000 ppm, especially below 2000 ppm, for monomers of the formula I and below 500 ppm, preferably below 200 ppm, for monomers of the formula II.

EXAMPLES

Purification of 1,1-Diphenylethylene (DPE)

Crude DPE (Aldrich or from reaction of phenylmagnesium bromide with acetophenone, acetylation with acetic anhydride and thermal elimination of acetic acid) is distilled through a column having at least 50 theoretical plates (spinning-band column; a Sulzer packed column for larger amounts) to a purity of 99.8%. The usually slightly yellow distillate is filtered through a 20 cm Alox column (Woelm alumina for chromatography, anhydrous), titrated with 1.5N sec-butyllithium to a deep red color and distilled off over a simple still head under reduced pressure (1 mbar). The resulting product is completely colorless and can be used directly in the anionic polymerization.

Polymerization

Solutions with living anions were generally handled under ultrapure nitrogen. The solvents were dried over anhydrous alumina.

In the Examples which follow, S represents styrene, DPE represents 1,1-diphenylethylene and the % ages are by weight, unless otherwise stated.

Example 1

Preparation of random S/DPE copolymer with an S-DPE molar ratio of 2:1; simultaneous addition of S, DPE and cyclohexane A 2 l glass reactor equipped with a jacket for cooling and heating and a horseshoe stirrer was inertized for several hours with a refluxing solution of DPE/sec-butyllithium in cyclohexane. After removal of the cleaning solution, 100 ml of cyclohexane, 100 ml of a mixture of 264.24 ml (270.38 g, 1.5 mol) of DPE and 344.37 ml (312.45 g, 3.0 mol) of styrene and also 9.71 ml of 0.5M sec-butyllithium solution in cyclohexane were introduced as initial charge at 25° C. The mixture at once turned red. The reactor contents were thermostated to 70° C. by means of the heating jacket, the heating greatly deepening the color of the solution. The remaining 508.6 ml of the S-DPE mixture were metered in over 40 min via an injection pump at a constant rate. At the same time 500 ml of cyclohexane were run in over the same period.

7 min after completion of the addition a further 249 ml of cyclohexane were added (polymer concentration 50%). The viscosity increased distinctly during the polymerization. After a further 15 min of postreaction time, the contents were titrated with ethanol to a colorless endpoint, the polymer was precipitated in ethanol by dropwise addition of the polymer solution, filtered off and repeatedly washed with boiling ethanol, and the resulting white powder was dried at 180° C. under reduced pressure (1 mbar) for 2 h.

Yield: 580 g (99.5%); volatiles: 0.3%; styrene content (FTIR): 54.5% (53.6% theor.); DPE content (FTIR): 45.1% (46.4% theor.); level of monomeric DPE (component B) 2180 ppm, level of styrene (component C) 384 ppm; Tg (DSC): 155° C.; range of glass transition stage: 9° C.; molar masses (GPC, polystyrene calibration, g/mol): Mn 105,000, Mw 126,000, M(peak maximum) 119,000.

Example 2

Preparation of a random S/DPE copolymer with an S-DPE molar ratio of 2:1; initial charge of DPE and cyclohexane and addition of S The reactor prepared as in Example 1 was charged at 25° C. with 749 ml of cyclohexane, 264.24 ml (270.38 g, 1.5 mol) of DPE and 9.71 ml of 0.5M sec-butyllithium solution and thermostated to 70° C. The first 300 ml of styrene were metered in over 5 min, the next 20 ml over 10 min and the remaining 24.37 ml of styrene over 15 min. After a postreaction time of 15 min the batch was worked up as described in Example 1.

Yield: 582 g (99.8%); volatiles: 0.1%; styrene content (FTIR): 54.1% (53.6% theor.); DPE content (FTIR): 45.5% (46.4% theor.); DPE monomer (component B): 350 ppm, styrene monomer (component C): 25 ppm; Tg (DSC): 156° C.; range of glass transition stage: 12° C.; molar masses (GPC, polystyrene calibration, g/mol): Mn 107,000, Mw 128,000, M(peak maximum) 120,000.

Example 3

Preparation of a random S/DPE copolymer with an S-DPE molar ratio of 1.1:1; initial charge of DPE and addition of S and cyclohexane The reactor prepared as in Example 1 was charged at 25° C. with 264.24 ml (270.38 g, 1.5 mol) of DPE and 7.37 ml of 0.5M sec-butyllithium solution and thermostated to 70° C. 189.4 ml (171.85 g, 1.65 mol) of styrene were premixed with 810.6 ml of cyclohexane. The mixture was metered in over 180 min by means of an injection pump by reducing the rate of addition according to a gradient method. The amounts added were:

| 0–30 min | 507.94 ml; |
| 30–60 min | 253.97 ml; |
| 60–90 min | 126.98 ml; |
| 90–120 min | 63.49 ml; |
| 120–150 min | 31.75 ml; |
| 150–180 min | 15.87 ml. |

After a postreaction time of 15 min, the batch was worked up as described in Example 1.

Yield: 441 g (99.7%); volatiles: 0.1%; styrene content (FTIR): 39.2% (38.9% theor.); DPE content (FTIR): 60.9% (61.1% theor.); DPE monomer (component B): 560 ppm; styrene monomer (component C): 12 ppm; Tg (DSC): 173° C.; range of glass transition stage: 13° C.; molar masses (GPC, polystyrene calibration, g/mol): Mn 104,000, Mw 124,000, M(peak maximum) 116,000.

Example 4

Preparation of an S/DPE-S diblock copolymer with an S-DPE molar ratio for the S/DPE block of 1.1:1.

The reactor prepared as in Example 1 was charged at 25° C. with 264.24 ml (270.38 g, 1.5 mol) of DPE and 14.74 ml of 0.5M sec-butyllithium solution and thermostated to 70° C. 189.4 ml (171.85 g, 1.65 mol) of styrene were premixed with 810.6 ml of cyclohexane. The mixture was metered in over 90 min by means of an injection pump by reducing the rate of addition in the form of a gradient as described in Example 3.

Following a postreaction time of 15 min, 442.2 g of styrene and 400 ml of cyclohexane were metered in over 15 min and the batch was worked up as described in Example 1 after a further 15 min.

Yield: 884 g (99.9%); volatiles: 0.05%; styrene content (FTIR): 69.4% (69.4% theor.); DPE content (FTIR): 30.5% (30.6% theor.); DPE monomer (component B): 72 ppm; styrene monomer 7 ppm; Tg (DSC, two equally high glass transition stages): 171° C.; width of glass transition stage: 15° C.; 105° C.; width of glass transition stage: 16° C. Molar masses (GPC, polystyrene calibration, g/mol): Mn 115,000, Mw 123,000, M(peak maximum) 119,000.

Example 5

Preparation of an S/DPE-S-S/DPE triblock copolymer with an S-DPE molar ratio for the S/DPE blocks of 1.1:1 and coupling with ethyl formate The reactor prepared as in Example 1 was charged at 25° C. with 264.24 ml (270.38 g, 1.5 mol) of DPE and 29.48 ml of 0.5M sec-butyllithium solution and thermostated to 70° C. 189.4 ml (171.85 g, 1.65 mol) of styrene were premixed with 810.6 ml of cyclohexane. The mixture was metered in over 60 min by means of an injection pump by reducing the rate of addition in the form of a gradient as described in Example 3. After a postreaction time of 10 min, 442.2 g of styrene and 400 ml of cyclohexane were metered in over 15 min. After a further 15 min, 546 mg of ethyl formate in 2 ml of cyclohexane were added dropwise to the point of complete decolorization. The polymer was worked up as described in Example 1.

Yield: 884 g (99.9%); volatiles: 0.05%; styrene content (FTIR): 69.4% (69.4% theor.); DPE content (FTIR): 30.5% (30.6% theor.); DPE monomer (component B): 381 ppm; styrene monomer (component C): 5 ppm; Tg (DSC, two equally high glass transition stages): 169° C.; width of glass transition stage: 17° C.; 106° C.; width of glass transition stage: 18° C. Molar masses (GPC, polystyrene calibration, g/mol): main peak M(peak maximum) 121,000, 72% area; secondary peak M(maximum) 60,000, 28% area.

Example 6

Preparation of random S/DPE copolymer with an S-DPE molar ratio of 1.1:1; initial charge of DPE and addition of S and tetrahydrofuran (THF)

The reactor prepared as in Example 1 was charged at 25° C. with 264.24 ml (270.38 g, 1.5 mol) of DPE and 7.37 ml of 0.5M sec-butyllithium solution and thermostated to 70° C. 189.4 ml (171.85 g, 1.65 mol) of styrene were premixed with 810.6 ml of THF. The mixture was metered in over 180 min by means of an injection pump by reducing the rate of addition in the form of a gradient as described in Example 3.

After a postreaction time of 15 min, the batch was worked up as described in Example 1.

Yield: 403 g (91.2%); volatiles: 3.7%; styrene content (FTIR): 42.6% (38.9% theor.); DPE content (FTIR): 57.3% (61.1% theor.); Tg (DSC): 159° C.; range of glass transition stage: 17° C.; molar masses (GPC, polystyrene calibration, g/mol): Mn 87,000, Mw 111,000, M(peak maximum) 108,000.

Example 7

Preparation of random S/1,1-di(3,4-dimethylphenyl) ethylene copolymer having an S-di(3,4-dimethylphenyl) ethylene molar ratio of 1.1:1; initial charge of di(3,4-dimethylphenyl)ethylene and addition of S and cyclohexane The reactor prepared as in Example 1 was charged at 25° C. with 355.5 g (1.5 mol) of freshly melted 1,1-di(3,4-dimethylphenyl)-ethylene and 8.79 ml of 0.5M sec-butyllithium solution and thermostated to 70° C. 189.4 ml (171.85 g, 1.65 mol) of styrene were premixed with 810.6 ml of cyclohexane. The mixture was metered in over 180 min by means of an injection pump by reducing the rate of addition in the form of a gradient as described in Example 3.

After a postreaction time of 15 min, the batch was worked up as described in Example 1.

Yield: 525 g (99.5%); volatiles: 0.2%; styrene content (FTIR): 32.7% (32.6% theor.); DPE monomer (component B): 65 ppm; styrene monomer (component C): 9 ppm; Tg (DSC): 175° C.; width of glass transition stage: 14° C.; molar masses (GPC, polystyrene calibration, g/mol): Mn 36,000, Mw 90,000, M(peak maximum) 89,000.

We claim:

1. A thermoplastic molding, composition of
A) from 10 to 100% by weight of a copolymer consisting essentially of the monomers of the general formulae I and II

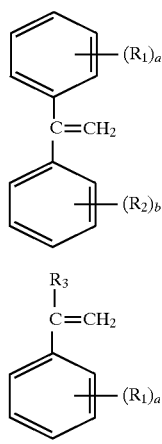

where
$R_1$ is H or alkyl of 1–22 carbon atoms,
$R_2$ is H or alkyl of 1–22 carbon atoms,
$R_3$ is H or alkyl of 1–4 carbon atoms,
a is 0, 1, 2, 3, 4 or 5, and
b is 0, 1, 2, 3, 4 or 5 as obtained by providing the monomers of the formula (I) as initial charge and metering in the monomers of the formula II during the reaction according to a gradient method such that, as the reaction progresses, the amount of monomer (II) added per unit time is essentially reduced according to the amount of monomer (I) still present;

B) from 0 to 3000 ppm, based on the weight of component a, of compounds of the general formula I;

C) from 0 to 500 ppm, based on the weight of component A, of compounds of the general formula II;

D) from 0 to 90% by weight, based on the total weight of the molding compound, of polymers other than A); and E) from 0 to 50% by weight, based on the total weight of the molding compound, of additives and processing aids.

2. Thermoplastic molding composition as claimed in claim 1, comprising from 0 to 1000 ppm of component B), based on the total weight of component A).

3. Thermoplastic molding composition as claimed in claim 1, comprising from 0 to 100 ppm of component B), based on the total weight of component A).

4. Thermoplastic molding composition as claimed in claim 1, comprising a copolymer of 1,1-diphenylethylene and styrene as component A.

5. A process for producing a copolymer (A), as described in claim 1, consisting essentially of the monomers of the general formulae (I) and (II) by anionic polymerization, which comprises providing the monomers of the formula (I) as initial charge and metering in the monomers of the formula (II) during the reaction according to a gradient method such that, as the reaction progresses, the amount of monomer (II) added per unit time is essentially reduced according to the amount of monomer (I) still present.

6. A process as claimed in claim 5, wherein the refractive index of the reaction mixture is continuously determined during the reaction and monomer II is added according to a gradient method as a function of the change in the refractive index.

7. Block copolymers with blocks A and B of the following general structure:

$(A—B)_n$

A—B—A

B—A—B

X [(A—B)$_n$]$_m$, X [(B—A)$_n$]$_m$, X [(A—B—A)$_n$]$_m$, or X [(B—A—B)$_n$]$_m$ where A is a block of copolymers of monomers of the general formulae I and II, B is a block of monomers of the general formula II, X is the radical of an m-functional coupling agent, n is an integer from 1 to 5, and m is an integer from 2 to 20.

8. Thermoplastic molding compounds comprising as essential components a block copolymer as claimed in claim 7, 0–3000 ppm of monomers of the general formula I and 0–500 ppm of monomers of the general formula II.

* * * * *